(12) United States Patent
Nitsch

(10) Patent No.: US 10,292,043 B2
(45) Date of Patent: May 14, 2019

(54) BLOCKING THE ACCEPTANCE OR THE PROCESSING OF A PACKET FOR LOADING A PROFILE INTO A EUICC

(71) Applicant: GIESECKE+DEVRIENT MOBILE SECURITY GMBH, München (DE)

(72) Inventor: Nils Nitsch, Markt Schwaben (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/765,880

(22) PCT Filed: Oct. 6, 2016

(86) PCT No.: PCT/EP2016/001660
§ 371 (c)(1),
(2) Date: Apr. 4, 2018

(87) PCT Pub. No.: WO2017/059958
PCT Pub. Date: Apr. 13, 2017

(65) Prior Publication Data
US 2018/0302782 A1    Oct. 18, 2018

(30) Foreign Application Priority Data

Oct. 7, 2015   (DE) .......... 10 2015 012 943

(51) Int. Cl.
*H04W 12/06*  (2009.01)
*H04W 8/20*  (2009.01)
(Continued)

(52) U.S. Cl.
CPC .......... *H04W 8/205* (2013.01); *H04W 8/183* (2013.01); *H04W 12/06* (2013.01); *H04W 12/04* (2013.01)

(58) Field of Classification Search
CPC ..... H04W 12/02; H04W 12/06; H04W 24/00; H04W 4/50; H04W 8/24; H04W 8/18;
(Continued)

(56) References Cited

U.S. PATENT DOCUMENTS 7,480,907 B1   1/2009  Marolia et al.
8,140,062 B1 *  3/2012  Hildner ............... H04L 41/0806
                                                        455/418
(Continued)

FOREIGN PATENT DOCUMENTS

EP    2747466 A1   6/2014
EP    2835995 A1   2/2015
(Continued)

OTHER PUBLICATIONS

"Embedded SIM Remote Provisioning Architecture Version 1.1," GSM Association, Dec. 17, 2013, 84 Pages.
(Continued)

*Primary Examiner* — Jean A Gelin
(74) *Attorney, Agent, or Firm* — Workman Nydegger

(57) ABSTRACT

A method for managing a profile for a subscription in a subscriber identity module comprises the steps of (a) sending a management message from a server to the subscriber identity module; (c) carrying out a management measure corresponding to the management message in the subscriber identity module; wherein the following step b) which is effected before step c): (b) requesting and receiving a user input at the subscriber identity module; and carrying out step (c) only on the occasion of a successful carrying out of step (b).

8 Claims, 1 Drawing Sheet

(51) Int. Cl.
*H04W 8/18* (2009.01)
*H04W 12/04* (2009.01)

(58) Field of Classification Search
CPC ....... H04W 8/20; H04W 8/183; H04W 8/205; H04W 12/04
See application file for complete search history.

(56) References Cited

U.S. PATENT DOCUMENTS

| | | | |
|---|---|---|---|
| 8,200,761 | B1 | 6/2012 | Tevanian |
| 2007/0044151 | A1* | 2/2007 | Whitmore ............... G06F 21/57 726/23 |
| 2010/0088696 | A1 | 4/2010 | Stoev et al. |
| 2010/0235318 | A1 | 9/2010 | Wang |
| 2011/0306318 | A1* | 12/2011 | Rodgers ................ H04W 8/183 455/410 |
| 2013/0165073 | A1 | 6/2013 | Madsen |
| 2014/0199962 | A1* | 7/2014 | Mohammed .......... H04M 15/70 455/406 |
| 2015/0304506 | A1* | 10/2015 | Zhu ....................... H04M 15/49 455/406 |
| 2016/0007190 | A1* | 1/2016 | Wane ...................... H04W 4/50 455/419 |
| 2016/0020804 | A1* | 1/2016 | Lee ....................... H04B 1/3816 455/558 |
| 2016/0105540 | A1* | 4/2016 | Kwon ............... H04N 21/41407 715/747 |
| 2016/0285493 | A1* | 9/2016 | Veneroso ............. H04B 1/3816 |
| 2017/0164184 | A1* | 6/2017 | Borse .................... H04L 67/306 |
| 2017/0214423 | A1* | 7/2017 | Park ..................... H04B 1/3818 |
| 2018/0054463 | A1* | 2/2018 | Chang .................... H04L 29/06 |

FOREIGN PATENT DOCUMENTS

| | | |
|---|---|---|
| EP | 2938108 A1 | 10/2015 |
| WO | 2012076419 A1 | 6/2012 |
| WO | 2016153977 A1 | 9/2016 |

OTHER PUBLICATIONS

"Remote Provisioning Architecture for Embedded UICC Technical Specification, Version 2.0," GSM Association, Oct. 13, 2014, 293 Pages.

German Office Communication from DE Application No. DE 10 2015 012 943.0, dated Jul. 28, 2016.

International Search Report from PCT Application No. PCT/EP2016/001660, dated Dec. 22, 2016.

* cited by examiner

BLOCKING THE ACCEPTANCE OR THE PROCESSING OF A PACKET FOR LOADING A PROFILE INTO A EUICC

FIELD OF THE INVENTION

The invention relates to a method for managing a profile for a subscription (subscription profile) in a subscriber identity module.

PRIOR ART

Mobile end devices are securely operated in radio networks by means of subscriber identity modules, also called secure elements. In particular mobile radio end devices, such as for example smartphones, as well as M2M end devices can be provided as mobile end devices.

Within the framework of arranging a subscriber identity module a subscription profile must be loaded into the subscriber identity module. Change requests regarding the subscription profile (or profile, for short) require the supplying of a changed subscription profile. In the case of plug-in SIM cards for mobile radio end devices, the change can be carried out by an exchange of the SIM card. Alternatively, a new subscription profile is loaded into the subscriber identity module, which is carried out in particular for firmly soldered subscriber identity modules (e.g. eUICC in the mobile radio region or firmly soldered M2M module) which cannot be readily exchanged. The managing of subscriptions, in particular by downloading subscription profiles and accompanying data into a subscriber identity module, is generally also referred to as subscription management.

The technical specifications [1] 12FAST.13—Embedded SIM Remote Provisioning Architecture 17 Dec. 2013", GSMA and [2] SGP02—Remote-Provisioning-Architecture-for-Embedded-UICC-Technical-Specification-v2.0, 13 Oct. 2014, GSMA describe the download and installation of a subscription profile into an eUICC. According to [1] 12FAST.13, in the loading of a subscription profile into a subscriber identity module there are involved a subscription management data preparation SM-SP and a subscription management secure router SM-SR.

The subscription management data preparation SM-SP has subscriber-identity-module-specific information available and generates with this, starting out from the subscription profile, a load packet to be loaded into the subscriber identity module, supplies the load packet to the subscription management secure router SM-SR which in turn loads the load packet into the subscriber identity module. In the subscriber identity module the load packet is extracted and starting out from the extracted package content the profile is implemented. Changes in profiles already existing in the subscriber identity module are effected in an analogous manner. Here, the subscription management secure router SM-SR receives a load packet containing the desired changes from the subscription management data preparation SM-SP and sends it to the subscriber identity module. In the subscriber identity module the load packet is extracted, the changes in the profile are implemented starting out from the extracted package contents.

The subscription management data preparation SM-SP can send (on the way via the subscription management secure router SM-SR) load packets having profiles to be loaded or changes in already implemented profiles to the subscriber identity module in an unnoticed and unrequested manner. In some circumstances, a holder or user of the mobile end device may not wish management measures such as profile loading or profile changing to be effected unnoticed or unrequested in the subscriber identity module.

The subscription management data preparation SM-SP may in particular be operated by an issuer of the subscriber identity module.

After the delivery of the subscriber identity module to the holder or user the holder or user enters into contractual usage agreements with other parties than the issuer of the subscriber identity module, for example, with a mobile radio network operator. Some management measures carried out unnoticed or unrequested by the issuer could offend against contractual usage agreements between the other party (e.g. network operator) and the user or holder. With the existing infrastructure for managing profiles the user/holder has no means to autonomously take care of the observance of his contractual usage agreements himself and to enforce these.

SUMMARY OF THE INVENTION

The invention is based on the object of creating a method for managing a profile for a subscription (subscription profile) in a subscriber identity module, which gives the holder or user of the subscriber identity module more autonomy against an issuer of the subscriber identity module.

This object is achieved by a method according to claim 1. Advantageous embodiments of the invention are stated in the dependent claims.

The method according to the invention for managing a profile for a subscription in a subscriber identity module comprises the steps: a) sending a management message from a server to the subscriber identity module and c) carrying out a management measure corresponding to the management message in the subscriber identity module. The method is characterized by the following step b) which is effected before step c): requesting and receiving a user input at the subscriber identity module and carrying out step c) only on the occasion of the successful carrying out of step b).

With the requirement of requesting and receiving a user input, before the management measure ordered by the management message is carried out in the subscriber identity module, it is ensured that the user has the possibility to examine upcoming management measures as to conformance with his own ideas and contractual obligations. An unnoticed carrying out of management measures which the user does not approve of is avoided. The user thus obtains the possibility to incorporate his declaration of will into the process of the management measures.

Thus, according to claim 1, a method for managing a subscription profile in a subscriber identity module is created, which gives the holder or user of the subscriber identity module more autonomy against an issuer of the subscriber identity module.

Optionally, as a user input there is provided an authentication input, in particular a static access code such as e.g. a PIN (personal identification number) or a static password, or a one-time password or OTP.

Optionally, the user input is requested and received via an input/output interface, e.g. a touch pad or touch display, of a mobile end device in which the subscriber identity module is operated.

Optionally, as a management measure there is provided a loading of a management message for loading a profile into the subscriber identity module, or/and an implementing of a profile in the subscriber identity module. In other words, e.g., the user obtains an intervention possibility and is prompted to make an input before a loading profile is loaded into the subscriber identity module. Alternatively or additionally, the user obtains, e.g., an intervention possibility and is prompted to make an input before an already loaded loading profile is implemented in the subscriber identity module. Depending on the concrete individual case, e.g., the load packet first is loaded in unhindered manner into the subscriber identity module, and only then the consent of the user is sought by means of his input. The user can now check the content of the load packet and approve or object the implementation of the load packet, depending on the content of the load packet, with his input. In another individual case, the consent of the user has already been sought before a load packet is loaded into the subscriber identity module. Here, the user can already refuse the loading of the load packet.

Optionally, as a management measure there is provided a loading of a management message for altering or/and an altering of a profile already implemented in the subscriber identity module. In this case, optionally, the management message first is loaded into the subscriber identity module. Then an input of the user is requested. Here, the user has the possibility to check the contents of the changing and, depending on the content, to allow (approval) or to prevent (objection) the changing.

Optionally, step a) is carried out as sending the management message from a data preparation server via a security router to the subscriber identity module.

Optionally, step c) comprises the following substeps: c1) releasing the management measure on the part of the subscriber identity module and c2) carrying out the management measure. The releasing is effected, optionally, in reaction to the receiving of an approving input on the part of the user, i.e. an approving declaration of will, e.g., by inputting "confirm" via a respective menu guidance on the touch display of the end device.

According to one embodiment of the invention, the user has the possibility to define exception criteria, so that certain management measures are carried out without any user input, also in unnoticed manner in the background.

According to the embodiment, the method further comprises the following step of, which is effected before step b), evaluating the management message as to whether an exception criterion is satisfied, wherein, if the exception criterion is satisfied by the management message, step b) is skipped and immediately step c) is carried out. For example, the exception criterion is satisfied by updates of the already implemented active profile. The exception criterion is not satisfied, for example, by management measures which relate to a different profile than the active profile, or which come from a different network operator or relate to a different network operator than the one which maintains the currently implemented active profile.

Optionally, the exception criterion was created on the basis of a user input received at an earlier time. With this earlier user input the user, for example, has defined and stored which management measures can be carried out without user input.

BRIEF DESCRIPTION OF THE DRAWINGS

Hereinafter the invention will be explained more closely on the basis of embodiment examples and with reference to the drawings, in which are shown.

DETAILED DESCRIPTION OF EMBODIMENT EXAMPLES

Figure 1:
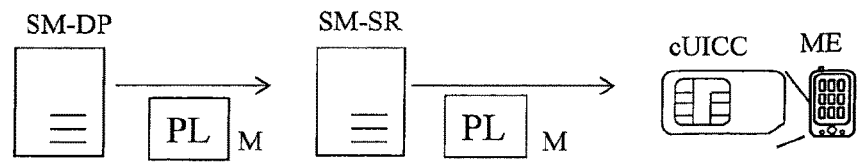
FIG. 1 a diagram for loading a load packet for loading a profile from a data preparation server via a security router into a subscriber identity module, according to the prior art.

FIG. 1 shows a diagram for loading a management message in the form of a load packet M from a data preparation server SM-DP into a subscriber identity module eUICC, according to the prior art. The load packet M comprises a load sequence PL for implementing a subscription profile P in the subscriber identity module eUICC. The data preparation server SM-DP sends the load packet M to a security router SM-SR which in turn sends the load packet M to the subscriber identity module eUICC. By processing the load sequence PL from the load packet M the profile P is implemented in the subscriber identity module eUICC.

Figure 2A:
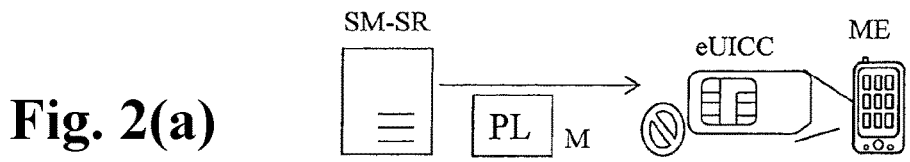
FIGS. 2(a) to 2(c) show a diagram for loading a load packet for loading a profile from a data preparation server via a security router into a subscriber identity module, according to an embodiment of the invention.
Figure 2B:
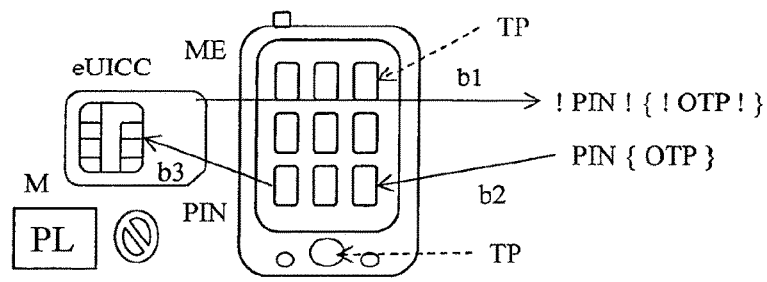
Figure 2C:
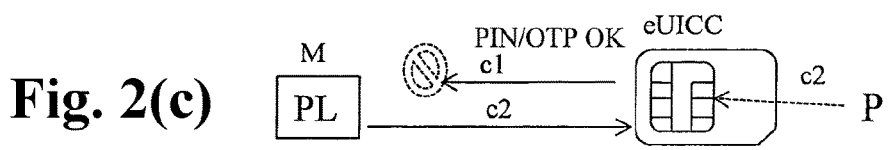

FIGS. 2(a) to 2(c) show a diagram for loading a management message in the form of a load packet M for loading a profile P from a data preparation server SM-DP via a security router SM-SR into a subscriber identity module eUICC, according to an embodiment of the invention. (a) First the data preparation server SM-DP sends the load packet M to the subscriber identity module eUICC. First, at the subscriber identity module eUICC either the acceptance of the load packet M or the processing of the load packet M is blocked (prevented). (b) Instead, (b1) a user of the end device ME is prompted by the subscriber identity module eUICC, via the end device ME in which the subscriber identity module eUICC is operated, to effect an input at the end device ME, e.g. to input a PIN (personal identification number) or a one-time password OTP. (b2) The user effects the requested input, e.g. by the input of PIN or OTP. (b3) The input, e.g. PIN or OTP, is forwarded to the subscriber identity module eUICC for verification. In the case of a successful verification (c), (c1) the blocking of accepting or processing the load packet M is removed. (c2) Consequently, the load packet M is loaded into the subscriber identity module eUICC and subsequently processed or the loaded but blocked load packet M is processed. By processing the load packet M the load sequence PL is worked through and the profile P is implemented in the subscriber identity module eUICC.

CITED PRIOR ART

[1] 12FAST.13—Embedded SIM Remote Provisioning Architecture 17 Dec. 2013, GSMA
[2] SGP02-Remote-Provisioning-Architecture-for-Embedded-UICC-Technical-Specification-v2.0, 13 Oct. 2014, GSMA

The invention claimed is:
1. A method for managing a profile for a subscription in a subscriber identity module, comprising the steps of:
  a) sending a management message from a server to the subscriber identity module;
  b) requesting and receiving a user input at the subscriber identity module, said request for the user input being generated and provided by the subscriber identity module after the management message has been received at the subscriber identity module; and
  c) carrying out a management measure corresponding to the management message in the subscriber identity module only after a successful carrying out of step b), further comprising the following step of, which is effected before step b), evaluating the management message as to whether an exception criterion is satisfied, wherein, if the exception criterion is satisfied by the management message, step b) is skipped and immediately step c) is carried out.

2. The method according to claim 1, wherein as a user input there is provided an authentication input which comprises one of a static access code or a one-time password.

3. The method according to claim 1, wherein the user input is requested and received via an input/output interface of a mobile end device in which the subscriber identity module is operated.

4. The method according to claim 1, wherein as a management measure there is provided a loading of a management message for loading a profile into the subscriber identity module or/and an implementing of a profile in the subscriber identity module.

5. The method according to claim 1, wherein as a management measure there is provided a loading of a management message for altering or/and an altering of a profile already implemented in the subscriber identity module.

6. The method according to claim 1, wherein step a) is carried out as sending the management message from a data preparation server via a security router to the subscriber identity module.

7. The method according to claim 1, wherein step c) comprises the following substeps:
   c1) releasing the management measure on the part of the subscriber identity module;
   c2) carrying out the management measure.

8. The method according to claim 1, wherein the exception criterion was created on the basis of a user input received at an earlier time.

* * * * *